United States Patent
Asahina et al.

(10) Patent No.: US 6,882,410 B2
(45) Date of Patent: Apr. 19, 2005

(54) FILTER PROCESSING SYSTEM FOR THE OUTPUT SIGNAL OF OPTICAL TIME DOMAIN REFLECTOMETER IN THE CHROMATIC DISPERSION DISTRIBUTION MEASUREMENT APPARATUS

(75) Inventors: Yoshimitsu Asahina, Fukuroi (JP); Takao Suzuki, Hamamatu (JP); Shoichi Aoki, Hamamatu (JP); Yoshiaki Ohtsuka, Kumamoto (JP)

(73) Assignees: Ando Electric Co., Ltd., Tokyo (JP); Kyusyu Ando Electric Company Limited, Kumamoto (JP)

( * ) Notice: Subject to any disclaimer, the term of this patent is extended or adjusted under 35 U.S.C. 154(b) by 140 days.

(21) Appl. No.: 10/346,005

(22) Filed: Jan. 16, 2003

(65) Prior Publication Data

US 2003/0234922 A1 Dec. 25, 2003

(30) Foreign Application Priority Data

Jan. 31, 2002 (JP) ........................ 2002-023471

(51) Int. Cl.$^7$ ............................................. G01N 21/00
(52) U.S. Cl. .................................................. 356/73.1
(58) Field of Search ................. 356/73.1; 398/1–38, 398/147, 155, 159; 385/37, 24, 10, 39, 31, 15, 123, 140

(56) References Cited

U.S. PATENT DOCUMENTS 5,956,131 A    9/1999  Mamyshev et al.
6,320,687 B1 * 11/2001  Ishikawa .................... 398/147

FOREIGN PATENT DOCUMENTS

EP    0 819 926 A2   1/1998
JP    10-083006      3/1998

* cited by examiner

Primary Examiner—Tu T. Nguyen
(74) Attorney, Agent, or Firm—Fish & Richardson P.C.

(57) ABSTRACT

A filter processing system making it possible to be able to set a frequency pass-band automatically and to provide the optimum filter to an input signal. A filter processing method of an output signal of an Optical Time Domain Reflectometer (OTDR) in a chromatic dispersion distribution measuring apparatus is disclosed. The filter processing method includes establishing measuring-condition parameters, generating an ideal signal waveform based on previously established chromatic dispersion values and the measuring-condition parameters, and providing correlation results between the ideal signal waveform and a filter input signal. The method also includes comparing the correlation results to a threshold value to generate a minimum chromatic dispersion value and a maximum chromatic dispersion value, and performing filter processing for the output of the OTDR based on the minimum chromatic dispersion value and the maximum chromatic dispersion value.

14 Claims, 8 Drawing Sheets

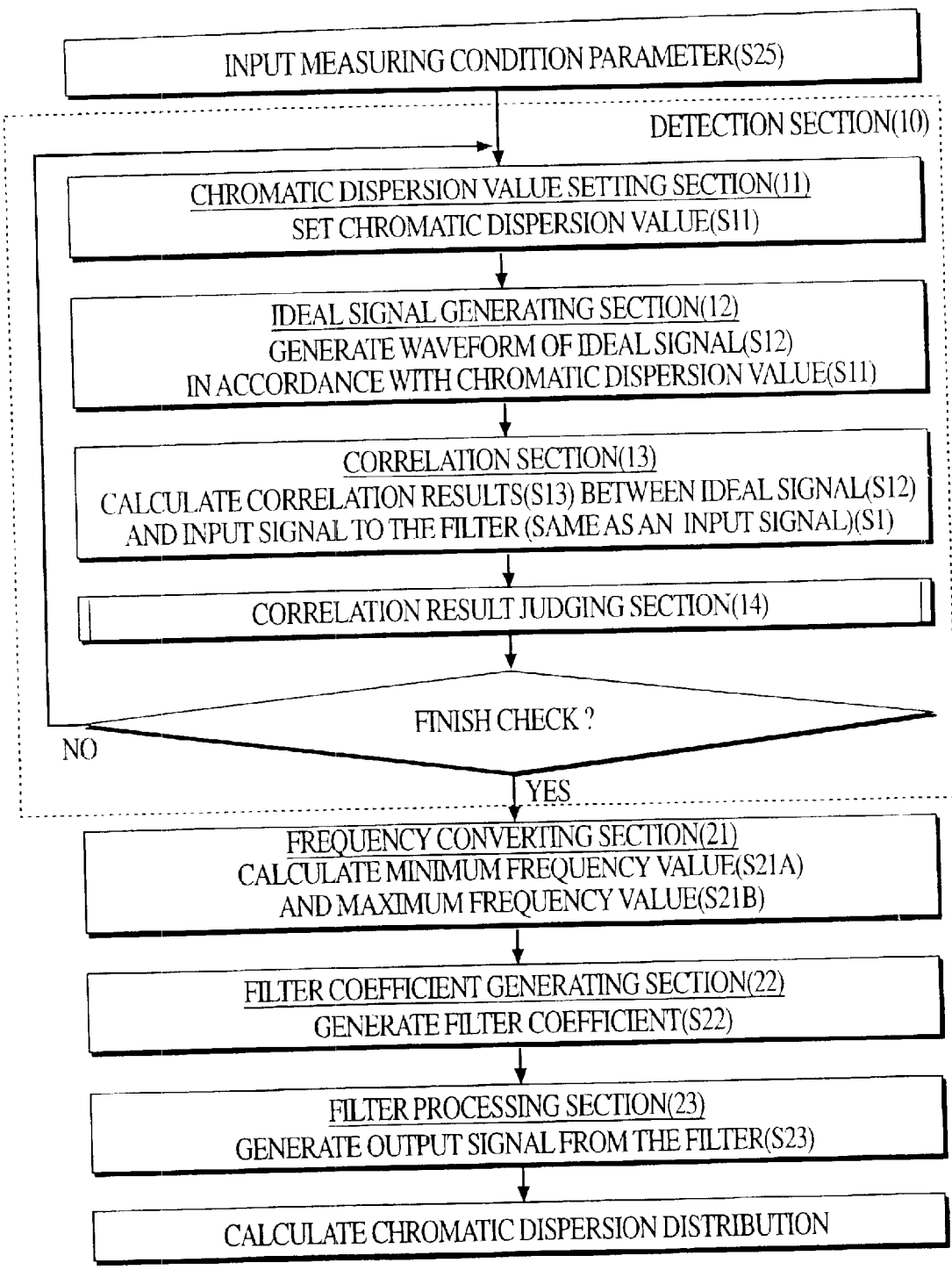

FILTER PROCESSING SYSTEM FOR THE OUTPUT SIGNAL OF OPTICAL TIME DOMAIN REFLECTOMETER IN THE CHROMATIC DISPERSION DISTRIBUTION MEASUREMENT APPARATUS

BACKGROUND OF THE INVENTION

1. Field of Invention

The present invention relates that a filter processing is performed in the input signal having the fluctuated intensity, and belonged to measurement of the chromatic dispersion distribution characteristics in the characteristics of the optical fiber used for ultrahigh speed optical communication field.

2. Description of the Prior Art

Presently, in the ultra high-speed optical communications field, in order to realize and maintain high quality communication, various researches about communication quality control and compensation technology of an optical fiber lines are advanced.

Based upon this, the demand from a market to characteristic evaluation of optical fiber became higher than former, and also in it, the chromatic dispersion characteristics attracts attention as an important item which discerns transmission restrictions by the wavelength band and the transmission speed.

And as for an example of this kind of chromatic dispersion distribution measurement of the optical fiber, Japanese Patent Publication No. Hei 10-83006 (corresponding to the U.S. Pat. No. 5,956,131 and the European Patent Application No. 0819926A2) is well known as shown in FIG. 6.

The principle of chromatic dispersion distribution measurement for the optical fiber is explained using FIG. 6, which showed a configuration of the conventional chromatic dispersion distribution measurement apparatus for the optical fiber.

In FIG. 6, a Laser Source 1 (LS1) generates coherent light having wavelength λ1, a Laser Source 2(LS2) generates coherent light having wavelength λ2, and these 2 lights are synthesized at a Coupler 3.

The synthesized light at the Coupler 3 is transformed to a pulse-like light synchronized to the clock signal (It is not illustrating) in A0 Switch 4, and amplified by an Erbium Doped Fiber Amplifier 5 (EDFA5).

An amplified light from EDFA 5 is supplied to a target Optical fiber 7 through an Optical Circulator 6.

Additionally, said Optical Circulator 6 branches the total backscattered light generated by incident light coming into the optical fiber 7.

A terminator 8 is repressing the Fresnel Reflection in the extreme of the optical fiber 7.

Besides, an Optical Band Pass Filter 9 operates to extract the one side of wavelength element of a four-wave mixing light generated by the interaction between each two wavelength in the total backscattered light generated by incident lights coming into the optical fiber 7.

An Optical Time Domain Reflectometer 10 (OTDR10) calculates a data pointing out the fluctuation of intensity based on a light of specific wavelength passing through the Optical Band Pass Filter 9 as a one side of wavelength element of four-wave mixing light generated by the interaction between a couple wavelengths of an incident light in the total backscattered light.

The data calculated in the OTDR10 accumulates to a RAM (Random Access Memory) of a Personal Computer 11 (PC11), and uses to a various computing.

FIG. 7 corresponding to FIG. 6 minutely shows a conventional procedure of measuring the chromatic dispersion distribution characteristics. Like FIG. 7, a target optical fiber connected to a measuring apparatus, and on starting the measurement of chromatic dispersion distribution characteristics for a target optical fiber;

Firstly, sets up measurement condition that two light sources having different wavelength each other (light source 1 & 2), OTDR and EDFA etc. (STEP S11).

After the setting up a measurement condition corresponding to STEP S11, executes measurement about a fluctuated intensity data of the light having a specific wavelength of the target optical fiber using OTDR. (STEP S12)

A data obtained in the measurement of STEP S12 send to a Personal Computer. (STEP S13)

A Personal Computer executes calculation of a chromatic dispersion distribution value using the data from OTDR. (STEP S14)

A chromatic dispersion distribution value, total dispersion value and a waive obtained by the processing in STEP S114 respectively are displayed in an indicator being inexistent in the figure. (STEP S15)

In the conventional measurement of chromatic dispersion distribution showing in FIG. 6, the inputted signal to the personal computer PC11 disposed the filter processing, which is inexistent in the figure. And the suchlike filter processing installed externally a frequency pass-band being arbitrary value or fixed value.

Hereinafter, a configuration of the filter processing system of the conventional chromatic dispersion distribution measuring apparatus being implemented in the PC11 for example in FIG. 6 will be explained with reference to FIG. 2.

A filter processing of the conventional chromatic dispersion distribution apparatus comprises an input signal S1, a minimum chromatic dispersion value S24A, a maximum chromatic dispersion value S24B, a measuring condition parameter S25, a frequency converting section 21, a minimum frequency value S21A, a maximum frequency value 21B, filter coefficient generating section 22, filter coefficient S22, a filter processing section 23 and an output signal from the filter S23 (a signal passed through the filter).

Deriving a signal frequency from a minimum chromatic dispersion value S24A, a maximum chromatic dispersion value S24B and a measurement condition parameter S25 which are having a fixed value or an externally arranged arbitrary value, above mentioned frequency converting section 21 outputs a minimum frequency value S21A and a minimum frequency value 21B.

The filter coefficient generating section 22 generates the filter coefficient 22S using the minimum frequency value S21A and the maximum frequency value 21B assigned by the inputted pass range, and outputs them.

The filter processing section 23 using the filter coefficient S22 being assigned in the filter coefficient generating section 22, provides a filter function for the supplied input signal S1, and outputs an output signal from the filter S23 as the output. At that time, a kind of the filter depends on the filter coefficient generating section 22.

A processing flow of the conventional system shown in next FIG. 2 will be explained using a flowchart of FIG. 3.

For a start, a minimum chromatic dispersion value S24A, a maximum chromatic dispersion value S24B and the measuring condition parameter S25 are set and measurement is started.

Next, the minimum frequency value S21A and the maximum frequency value S21B are derived from the minimum chromatic dispersion value S24A, the maximum chromatic dispersion value S24B and the measuring condition parameter S25 at the frequency converting section 21.

Subsequently, the coefficient generating section 22 generates the filter coefficient S22 from the minimum frequency value S21A and the maximum frequency value S21B, which were calculated by the frequency converting section 21.

Moreover, the filter processing section 23 performs filter operation using the filter coefficient S22 provided from the coefficient generating section 22, and outputs an output signal from the filter S23.

After that, the chromatic dispersion distribution measurement results are accomplished by performing operation processing of the chromatic dispersion distribution to the output signal from the filter S23.

However, such a system described in the FIG. 2, there is a difficulty to providing consistently a best suited filter for the input signals having an intensity fluctuation, since the frequency pass-band of the filter is set to an arbitrary value from the outside or is fixed to a value derived from the frequency converting section 21.

A problem (goal) of the present invention is to provide the filter processing system configuring constantly optimum filter by setting up a frequency pass-band automatically.

SUMMARY OF THE INVENTION

In order to solve the above described problem, according to a first aspect of the present invention, a filter processing system for an output signal of an OTDR in a chromatic dispersion distribution apparatus measuring a chromatic dispersion distribution characteristics of an optical fiber;

Comprises: an ideal signal generating method that generates the ideal signal waveforms being corresponding to the chromatic dispersion values coming from a chromatic dispersion setting method sequentially, and the said ideal signal generating method that generates the ideal signal waveforms based on the measuring condition parameters setup beforehand;
a correlation processing method to output results of the correlation between the input signal waveform and the ideal signal waveform; a correlation result judging method to compare the correlation results with a threshold value;
And: depending on a minimum chromatic dispersion value and a maximum chromatic dispersion value coming each from the correlation result judging method, with performs filter processing for the output signals of the OTDR.

Besides, the chromatic dispersion values are used for calculating the minimum chromatic dispersion value and maximum chromatic dispersion value by repeated processing to calculate serially the ideal signal waveform with given configured interval in a possible setting range. (Second aspect of the present invention)

Additionally, the correlation result judging method sets a chromatic dispersion value having exceeded threshold ranges in the correlation results to the minimum chromatic dispersion value and the maximum chromatic dispersion value respectively. (Third aspect of the present invention)

Additionally, the measuring condition parameter includes first and second light signal wavelengths and a measurement range at the least. (Fourth aspect of the present invention)

Additionally, a filter processing system for the OTDR output signals in the chromatic dispersion distribution measuring apparatus comprises:

an ideal signal generating method that generates the ideal signal waveforms being corresponding to the signal frequency values coming from a signal frequency settings method sequentially;
and the said ideal signal generating method that generates the ideal signal waveforms based on the measuring condition parameters set up beforehand;
a correlation processing method to output a correlation result of the input signal waveform and the ideal signal waveform;
a correlation result judging method to compare the correlation results with the threshold, and performs filter processing for the OTDR output signal with responding to a minimum frequency value and a maximum frequency value coming respectively from the correlation result judging method. (Fifth aspect of the present invention)

Additionally, the configured signal frequency value is characterized by calculating the minimum frequency and the maximum frequency, and is characterized by performing repeated calculation to obtain the ideal signal waveform using given setting intervals continuously in an available setting range. (Sixth aspect of the present invention)

Additionally, the correlation result judging method outputs "a signal frequency value which has a correlation result exceeding a threshold" as a minimum frequency value and/or a maximum frequency value. (Seventh aspect of the present invention)

Additionally, the measuring condition parameter includes at the least a first light signal wavelength, a second light signal wavelength and a measurement range. (Eighth aspect of the present invention)

BRIEF DESCRIPTION OF THE DRAWINGS

FIGS. 4(a), 4(b) are the flow chart of the system of the present invention.

DETAILED DESCRIPTION OF THE INVENTION

Figure 1:
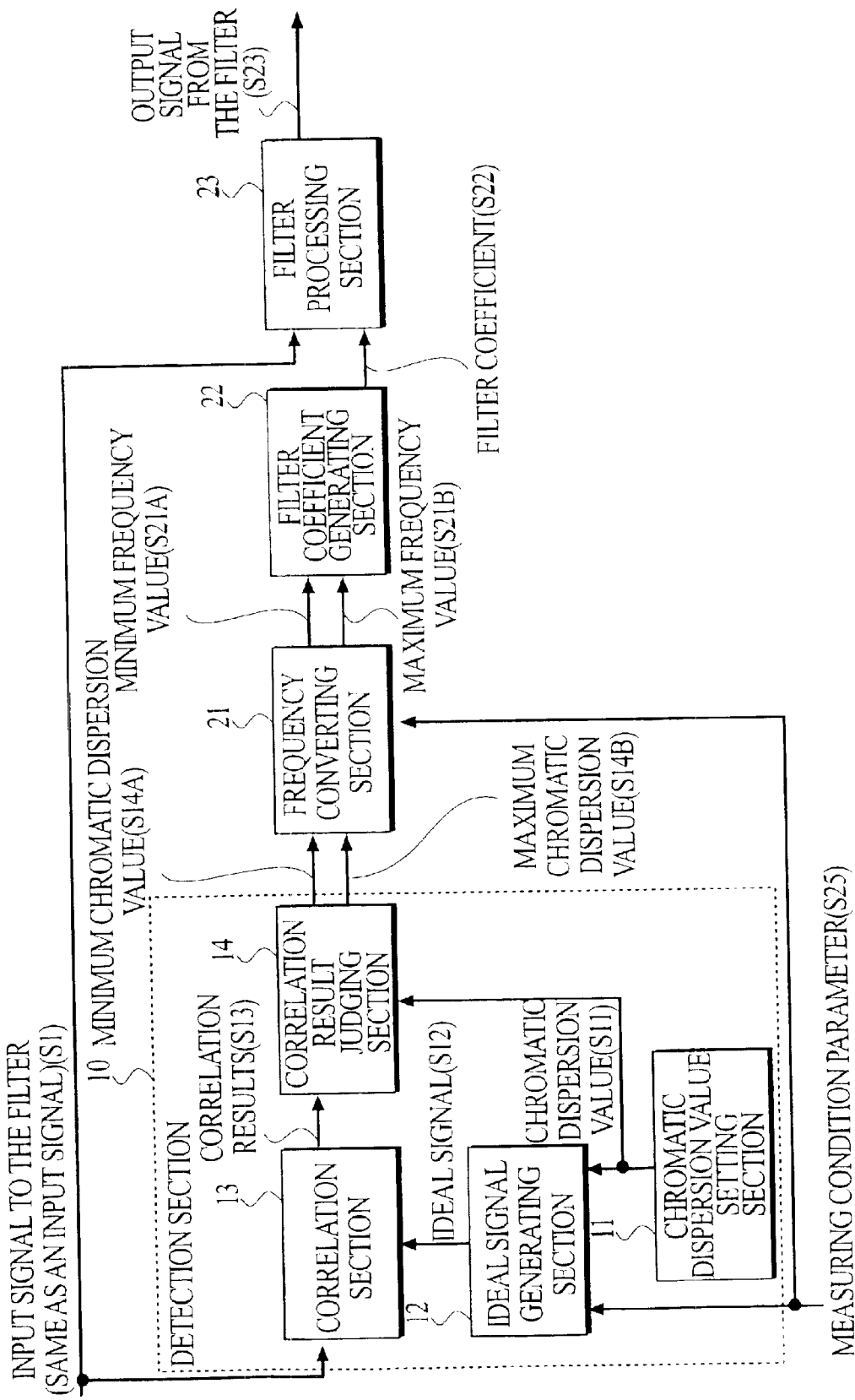
FIG. 1 shows a configuration of a filter processing section in the chromatic dispersion distribution measuring apparatus according to the present invention.
Figure 2:
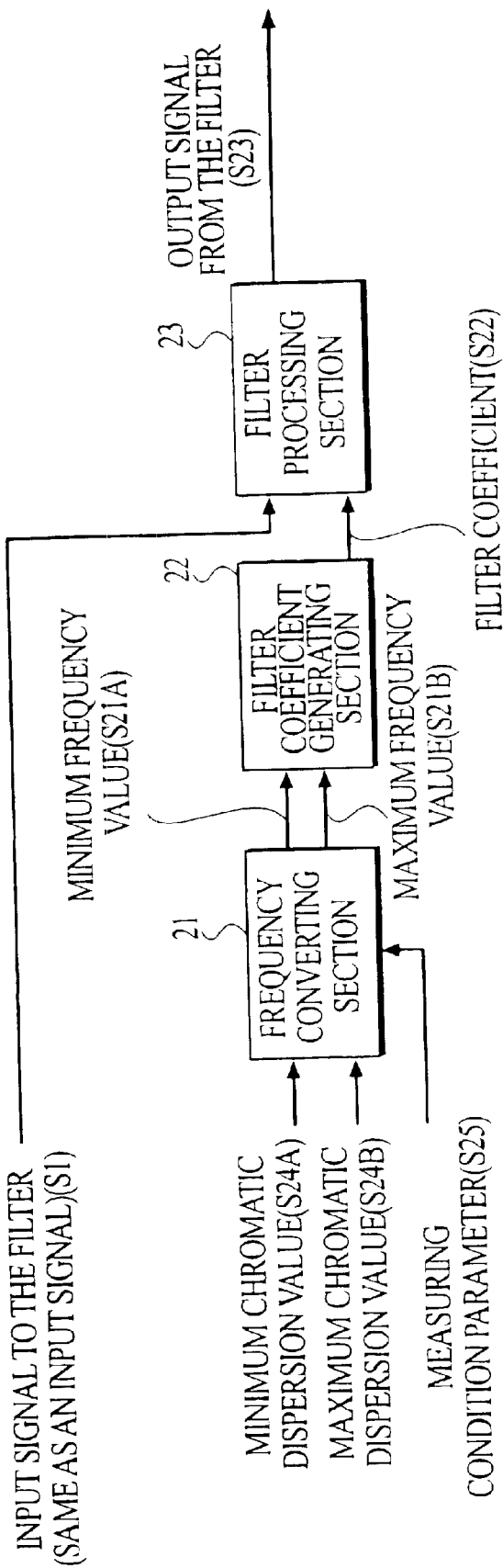
FIG. 2 shows a configuration of a filter processing section in the chromatic dispersion distribution measuring apparatus of conventional art.

Hereafter, one of an embodiment of the present invention will be explained in detail with reference to the drawing.

FIG. 1 is a block diagram showing the structure of the filter processing system of the chromatic dispersion distribution measurement apparatus to which the present invention applied.

In FIG. 1, which is showing the filter processing system of the chromatic dispersion distribution measurement apparatus implementing the present invention, symbol S1 denotes an input signal, reference number 10 denotes a detection section, symbol 14A denotes a minimum chromatic dispersion value, symbol 14B denotes a maximum chromatic dispersion value, reference number 21 denotes a frequency converting section, symbol 21A denotes a minimum frequency value, symbol 21B denotes a maximum frequency value, symbol S25 denotes a measuring condition parameter, reference number 22 denotes a filter coefficient generating section, symbol S22 denotes a filtering coefficient, reference number 23 denotes a filter processing section, and symbol S23 denotes an output signal from the filter.

Moreover, the detection section 10 added in the present invention comprises a chromatic dispersion value setting section 11, a chromatic dispersion value S11, an ideal signal generating section 12, an ideal signal S12, a correlation section 13, the correlation result S13 and the correlation result judging section 14.

In FIG. 1, the chromatic dispersion value setting section 11 sets the chromatic dispersion value S11 for generating an ideal signal, and outputs the value thereof.

Additionally, the ideal signal generating section 12 calculates the ideal signal S12 suitable for the characteristic of current input signal from a known formula, the measuring condition parameter S25 and the chromatic dispersion value S11.

Additionally, the correlation section 13 calculates the correlation on the time-axis of the ideal signal S12 and the input signal S1 by using correlation operational-formula such as the Schwarz's inequality, and outputs the correlation results S13 to the correlated result judging section 14.

Additionally, the correlated result judging section 14 generates and outputs a minimum chromatic dispersion value S14A and a maximum chromatic dispersion value S14B among the chromatic dispersion values (S11) having exceeded threshold.

Additionally, the frequency converting section 21 derives the signal frequency from the minimum chromatic dispersion value S14A, maximum chromatic dispersion value Sl4B and the measuring condition parameter S25 which were determined by taking correlation the ideal signal S12 and the input signal S1 on the time-axis. And the frequency converting section 21 outputs the minimum frequency value S21A and the maximum frequency value S21B.

Additionally, the filter coefficient generating section 22 derives and outputs the filer coefficient S22, using the inputted minimum frequency value S21A and a maximum frequency value S21B.

Additionally, the filter processing section 23 performs a filter processing to the input signal S1 using the filter coefficient S22 appointed. And the filter processing section is outputting the output signal from the filter 23.

At that time, a kind of the filter depends on the filter coefficient generating section 22.

Additionally, by replacing the chromatic dispersion value setting section 11 with a signal frequency setting section 11, and by replacing the chromatic dispersion value S11 with a signal frequency value S11, it becomes unnecessary to calculate a signal frequency from the chromatic dispersion value by the frequency converting section 21, and the signal frequency value S11 would be determined as a maximum value or a minimum value of frequency pass-band directly.

Figure 4B:
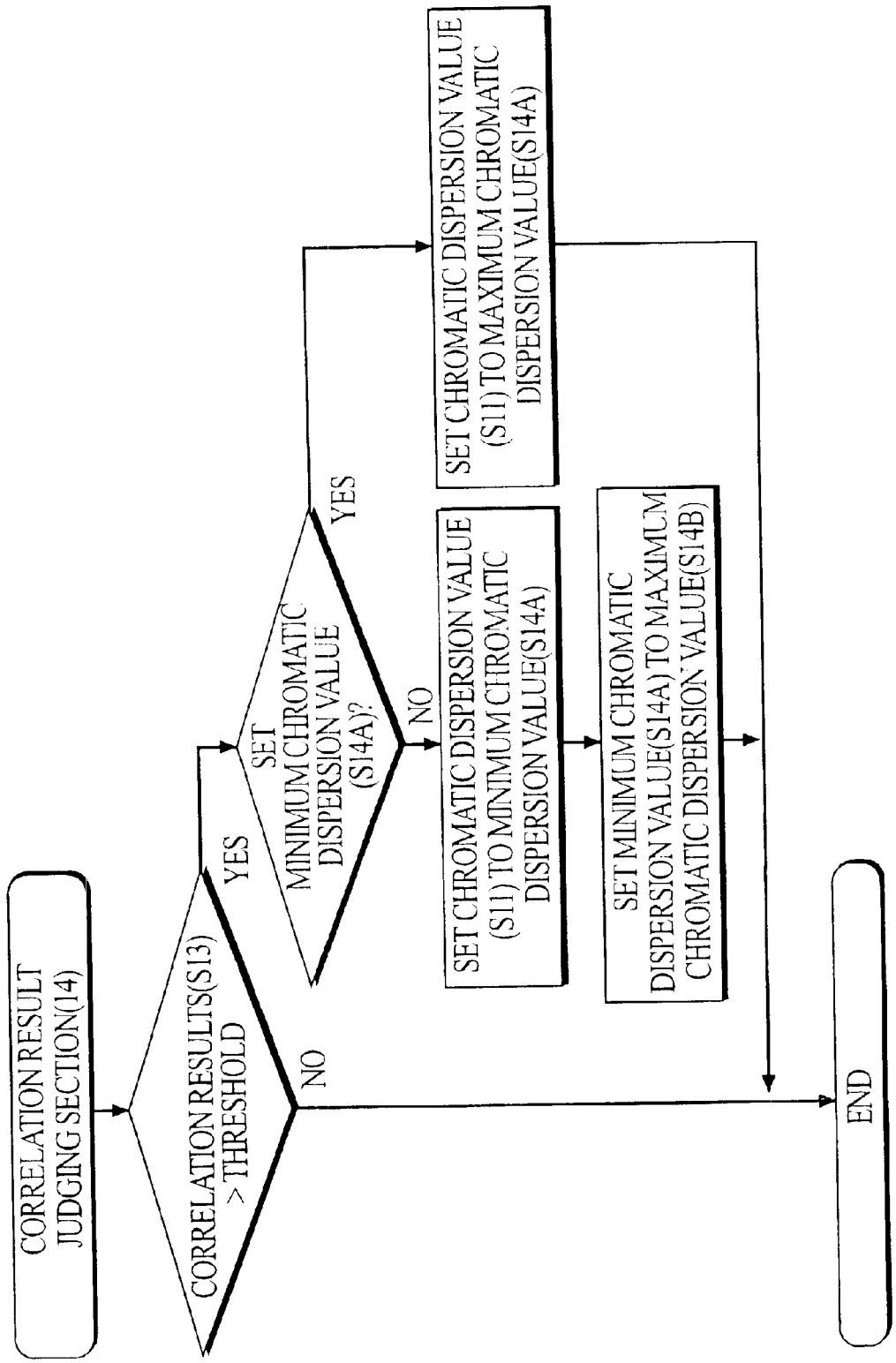
Figure 5:
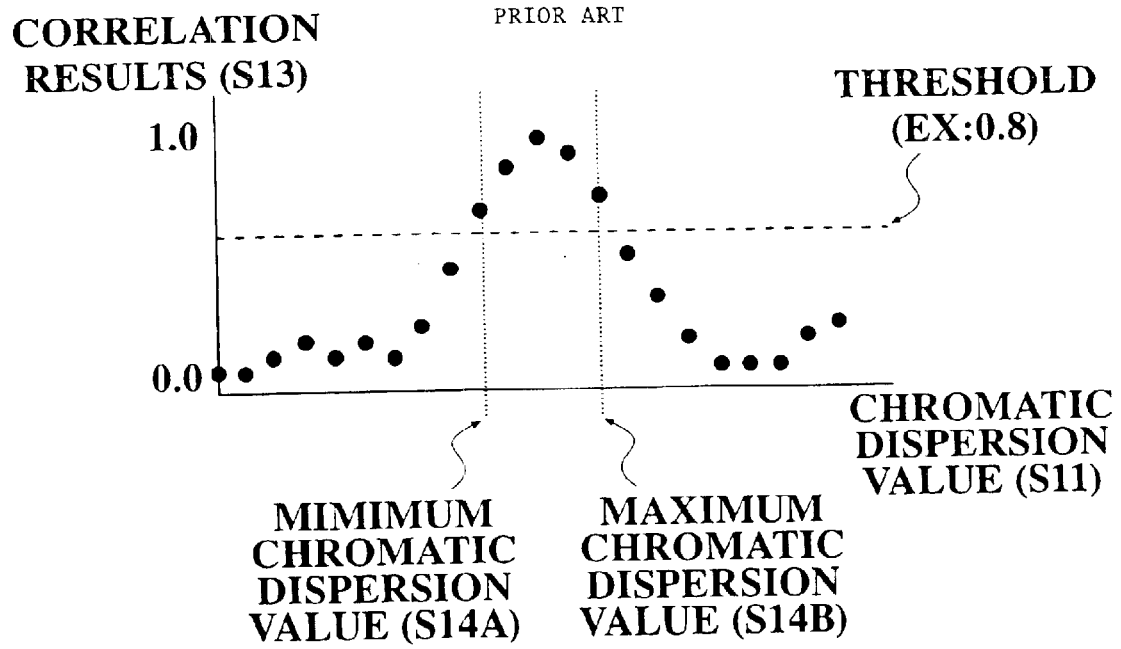
FIG. 5 is showing the setting relation between a correlation result, a minimum chromatic dispersion value, and a maximum chromatic dispersion value.
Figure 6:
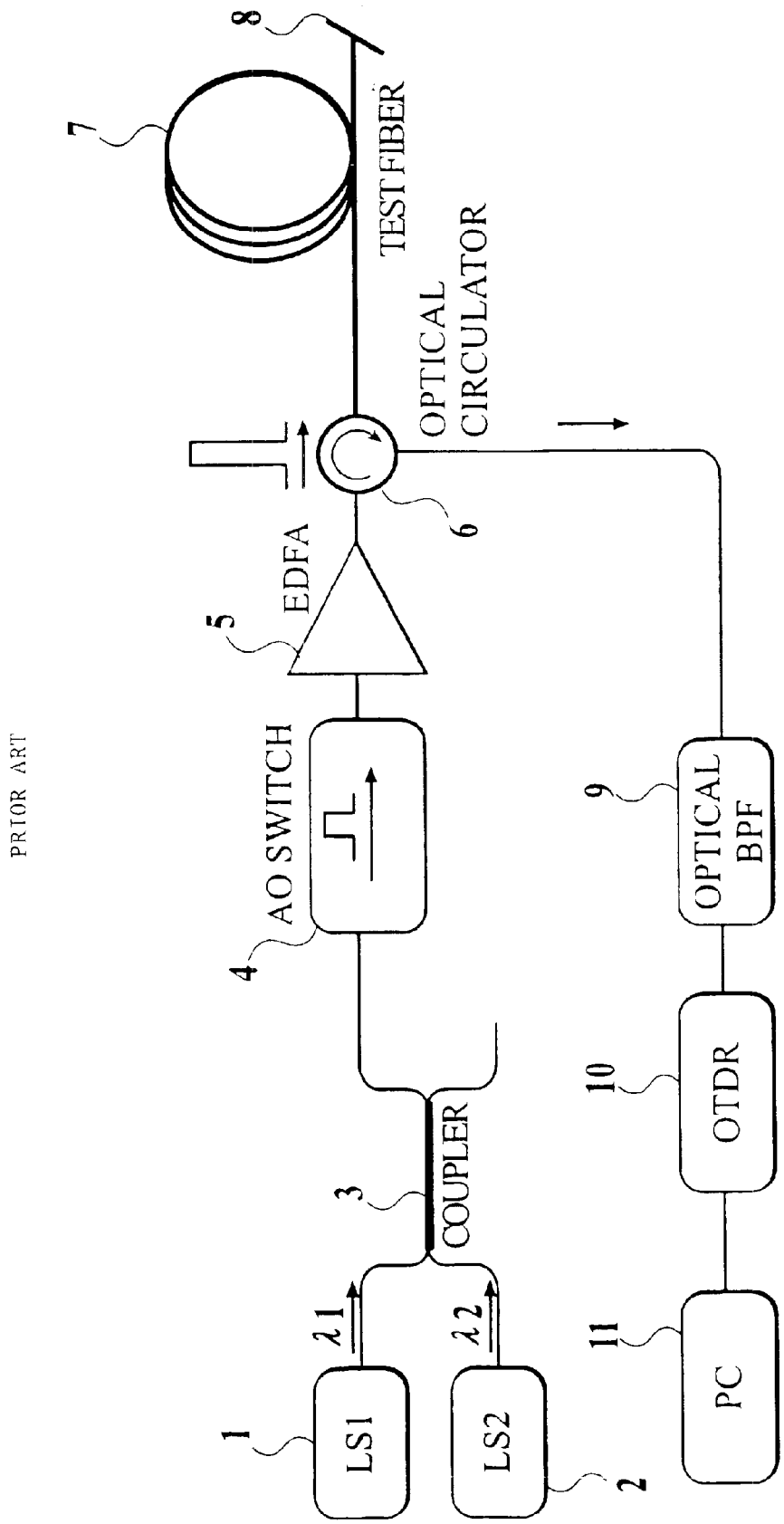
FIG. 6 is the figure showing a conventional chromatic dispersion measuring apparatus for an optical fiber.
Figure 7:
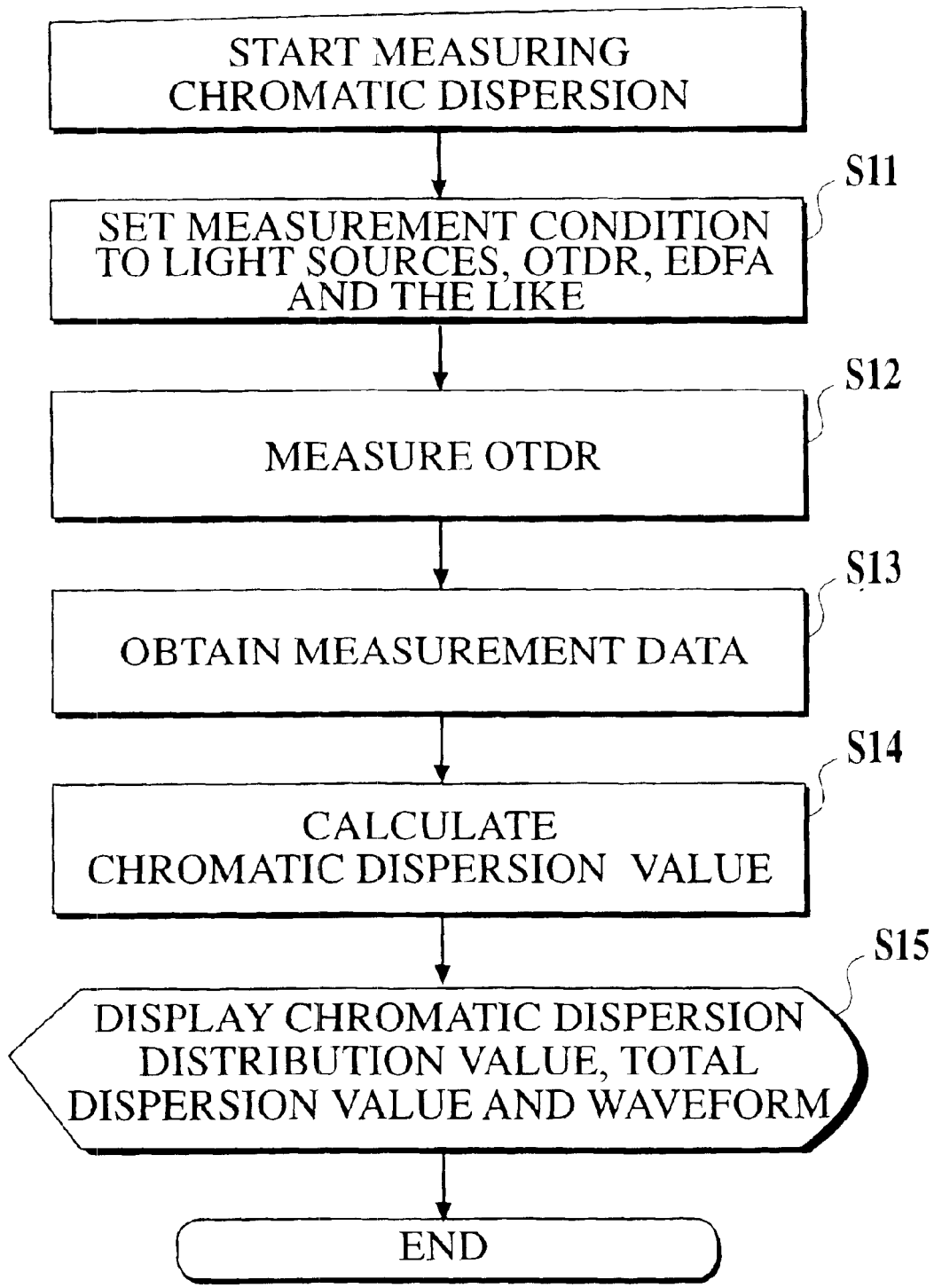
FIG. 7 shows a chromatic dispersion measuring procedure of conventional art.

Next, a processing flow of the method of the present invention shown in the FIG. 1 will be explained using FIG. 4.

Firstly, a measuring condition parameter S25 is inputted, and then it starts the measurement.

Next, a chromatic dispersion value setting section 11 sets and outputs a chromatic dispersion value S11.

In the chromatic dispersion value setting section 11, an available setting range and interval of the chromatic dispersion value S11 are decided in advance, for example a setting range is 100~300 ps/nm/km, a setting interval is 1 ps/nm/km etc. That is, 100 ps/nm/km will be assigned firstly as the chromatic dispersion value S11 in the above-mentioned example.

Since the chromatic dispersion value S11 is set, an ideal signal generating section 12 generates a waveform corresponding to the chromatic dispersion value S11.

Next, a correlation section 13 calculates a correlation results S13 which correlated an inputted ideal signal S12 and an input signal S1.

In the case of applying Schwarz' inequality as a correlation formula, the correlation calculation result is a value of 0 or 1.

The correlation results S13 is compared with a threshold value in a correlation result judging section 14.

If the correlation result S13 is not exceeding the threshold value, it performs nothing and returns to the chromatic dispersion value setting section 11.

If the correlation result S13 is exceeding the threshold value, it assigns the chromatic dispersion value S11 in the current round to a minimum chromatic dispersion value S14A and maximum chromatic dispersion value S14B respectively, and returns to the chromatic dispersion value setting section 11.

Here, the processing is returned to the chromatic dispersion value setting section 11.

Then a next chromatic dispersion value S11 being incremented by specified interval; for example, 101 ps/nm/km is replaced with a previous chromatic dispersion value S11.

Subsequently, a sequences procedure is repeated with in the ideal signal generating section 12 and the correlation result judging section 14, until the maximum value of setting range of the chromatic dispersion value S12.

Additionally in the correlation result judging section 14, if a correlation results S113 is not exceeding the threshold in the first step of the processing and is exceeding the threshold in the second step subsequently, then the current chromatic dispersion value S11 is assigned as minimum chromatic dispersion value S14A and maximum chromatic dispersion value S14B respectively, and returns to the chromatic dispersion value setting section 11.

Additionally, if the correlation result S13 is exceeding the threshold after a minimum chromatic dispersion value S14A, the current assigned chromatic dispersion value S11 is assigning newly as a maximum chromatic dispersion value S14B, and returns to the chromatic dispersion value setting section 11.

That is, the minimum chromatic dispersion value S14A is the chromatic dispersion value S11 which exceeded first the threshold, and the maximum chromatic dispersion value S14B is the chromatic dispersion value S11 which exceeded last the threshold.

If the minimum chromatic dispersion value S14A and the maximum chromatic dispersion value S14B were obtained by the repeated sequence processing until maximum value for example 300 ps/nm/km, in the setting range of the chromatic dispersion value S11. The processing goes to a frequency converting section 21 through out the finish check.

Figure 3:
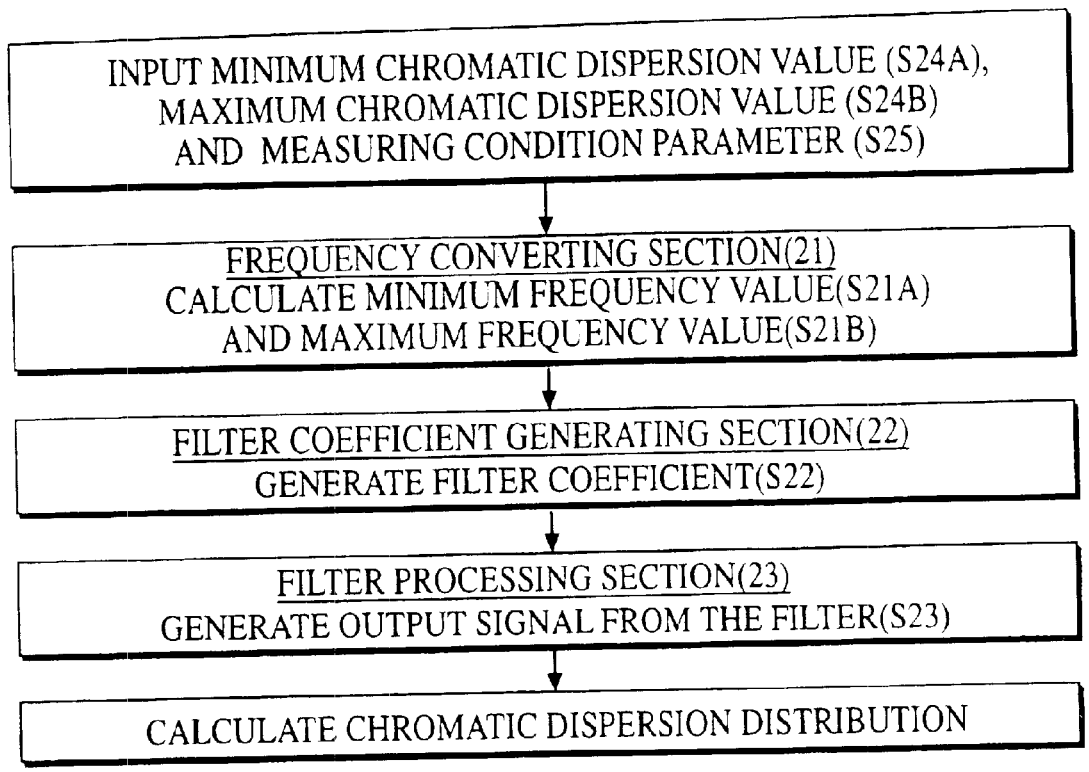
FIG. 3 is the flow chart of the conventional system.

An explanation of the processing sequence from the frequency converting section 21 will be omitted because of the same as FIG. 3 in the related art.

The present invention given in claims 1–4, a filter processing system for the outgoing signals of OTDR in the chromatic dispersion distribution measurement apparatus comprises: measuring condition parameters set beforehand; an ideal signal generating method generating ideal signal waveforms based on the chromatic dispersion values setting up sequentially from a chromatic dispersion value setting method; a correlated processing method outputting results of correlation between said ideal signal waveforms and an input signal waveform; and a correlation result judging method comparing said correlation results with a threshold.

Since the architecture is that the filter processing for an output of OTDR is performed in response to a minimum chromatic dispersion value and a maximum chromatic dispersion value which were obtained by the correlation result judging method, the frequency pass-band of the filter to the output of OTDR can set an optimum value automatically, and it can be providing always an optimum filter for the input signals of the chromatic dispersion distribution measurement apparatus.

The present invention given in claims 5–8, the filer processing system for outgoing signals of OTDR in the chromatic dispersion distribution measurement apparatus measuring a chromatic dispersion distribution characteristics of the target optical fiber comprises: the ideal signal waveforms being corresponding to the chromatic dispersion values coming from a chromatic dispersion setting method sequentially, and the said ideal signal generating method that generates the ideal signal waveforms based on the measuring condition parameters setup beforehand; a correlated processing method outputting a result of correlation between the ideal signal waveform to an input signal waveform.

Since the architecture is that the filter processing for an output of OTDR is performed in response to a minimum chromatic dispersion value and a maximum chromatic dispersion value which were obtained by said correlation result judging section, it becomes unnecessary to calculate a signal frequency from the chromatic distributed value and the frequency pass-band of the filter to the output of OTDR can set an optimum value automatically, and it can be providing always optimum filter for the input signals of the chromatic dispersion distribution measurement apparatus.

What is clamed is:

1. A filter processing system of an output signal of an Optical Time Domain Reflectometer (OTDR) in a chromatic dispersion distribution measuring apparatus, the filter processing system comprising:

means for generating an ideal signal waveform based on chromatic dispersion values and based on measuring-condition parameters, means for providing correlation results between the ideal signal waveform and a filter input signal, means for comparing the correlation results to a threshold value, and means for performing filter processing for the output of the OTDR based on a minimum chromatic dispersion value and a maximum chromatic dispersion value obtained from said means for comparing.

2. The filter processing system according to claim 1 wherein the chromatic dispersion values are used to calculate the minimum chromatic dispersion value and maximum chromatic dispersion value by repeatedly calculating the ideal signal waveform with a given configured interval in an available setting range.

3. The filter processing system according to claim 2 comprising:

means for setting a chromatic dispersion value exceeding the threshold value in the correlation results for at least one of the minimum chromatic dispersion value and the maximum chromatic dispersion value respectively; and means for outputting at least one of the minimum chromatic dispersion value and the maximum chromatic dispersion value.

4. The filter processing system according to claim 2 wherein the measuring condition parameters comprises a first light signal wavelength and a second light signal wavelength input to said chromatic dispersion distribution measurement apparatus respectively, and a measurement range.

5. The filter processing system according to claim 1 comprising:

means for setting a chromatic dispersion value exceeding the threshold value in the correlation results for at least one of the minimum chromatic dispersion value and the maximum chromatic dispersion value respectively; and means for outputting at least one of the minimum chromatic dispersion value and the maximum chromatic dispersion value.

6. The filter processing system according to claim 5 wherein the measuring condition parameters comprises a first light signal wavelength and a second light signal wavelength input to said chromatic dispersion distribution measurement apparatus respectively, and a measurement range.

7. The filter processing system according to claim 1 wherein the measuring condition parameters comprise a first light signal wavelength and a second light signal wavelength input to said chromatic dispersion distribution measurement apparatus respectively, and a measurement range.

8. A filter processing method of an output signal of an Optical Time Domain Reflectometer (OTDR) in a chromatic dispersion distribution measuring apparatus, said filter processing method comprising:

establishing measuring-condition parameters, generating an ideal signal waveform based on previously established chromatic dispersion values and the measuring-condition parameters, providing correlation results between the ideal signal waveform and a filter input signal, comparing the correlation results to a threshold value to generate a minimum chromatic dispersion value and a maximum chromatic dispersion value, and performing filter processing for the output of the OTDR based on the minimum chromatic dispersion value and the maximum chromatic dispersion value.

9. The filter processing method according to claim 8, wherein the chromatic dispersion values are used to calculate the minimum chromatic dispersion value and maximum chromatic dispersion value by repeatedly calculating the ideal signal waveform with a given configured interval in an available setting range.

10. The filter processing method to claim 9 further comprising:

setting a signal frequency value exceeding the threshold value in the correlation results for at least one of a minimum frequency value and a maximum frequency value respectively, and outputting at least one of the minimum frequency value and the maximum frequency value.

11. The filter processing method according to claim 9 wherein said measuring parameters comprise a first light signal wavelength and a second light signal wavelength input to said chromatic dispersion distribution measurement apparatus respectively, and a measurement range.

12. The filter processing method to claim 8 further comprising:

setting a signal frequency value exceeding the threshold value in the correlation results for at least one of a minimum frequency value and a maximum frequency value respectively, and outputting at least one of the minimum frequency value and the maximum frequency value.

13. The filter processing method according to claim 12 wherein said measuring parameters comprise a first light signal wavelength and a second light signal wavelength input to said chromatic dispersion distribution measurement apparatus respectively, and a measurement range.

14. The filter processing method according to claim 8 wherein said measuring parameters comprise a first light signal wavelength and a second light signal wavelength input to said chromatic dispersion distribution measurement apparatus respectively, and a measurement range.

* * * * *